(12) United States Patent  
Girlich

(10) Patent No.: US 8,371,527 B2
(45) Date of Patent: Feb. 12, 2013

(54) CONVEYING DEVICE FOR A TROLLEY IN AN AIRCRAFT CABIN

(75) Inventor: Heinz Girlich, Hamburg (DE)

(73) Assignee: Airbus Operations GmbH (DE)

( * ) Notice: Subject to any disclaimer, the term of this patent is extended or adjusted under 35 U.S.C. 154(b) by 435 days.

(21) Appl. No.: 12/475,143

(22) Filed: May 29, 2009

(65) Prior Publication Data

US 2009/0294394 A1  Dec. 3, 2009

Related U.S. Application Data

(60) Provisional application No. 61/057,276, filed on May 30, 2008.

(30) Foreign Application Priority Data

May 30, 2008  (DE) .......................... 10 2008 026 087

(51) Int. Cl.
*B64D 13/00* (2006.01)
(52) U.S. Cl. .................................................... 244/118.5
(58) Field of Classification Search ............... 244/118.1, 244/118.5
See application file for complete search history.

(56) References Cited

U.S. PATENT DOCUMENTS

| | | | | |
|---|---|---|---|---|
| RE32,176 E | * | 6/1986 | Vernon ...................... | 244/118.5 |
| 5,205,515 A | * | 4/1993 | Luria .......................... | 244/118.5 |
| 5,322,244 A | * | 6/1994 | Dallmann et al. .......... | 244/118.5 |
| 5,413,292 A | * | 5/1995 | Luria .......................... | 244/118.1 |
| 5,449,264 A | * | 9/1995 | Poletto ....................... | 414/391 |
| 7,159,821 B2 | * | 1/2007 | Harrington et al. ........ | 244/118.5 |

FOREIGN PATENT DOCUMENTS

| | | |
|---|---|---|
| DE | 1 955 299 A | 5/1971 |
| DE | 40 21 021 A1 | 1/1992 |
| FR | 2 335 398 A1 | 7/1977 |

* cited by examiner

*Primary Examiner* — Tien Dinh
*Assistant Examiner* — Keith L Dixon
(74) *Attorney, Agent, or Firm* — Barnes & Thornburg LLP

(57) ABSTRACT

The invention relates to a conveying device for a trolley, in particular to a refreshments trolley, in an aircraft passenger cabin and consists in the fact that the conveying device comprises an electric drive with two drive wheels 12, 13 for moving the trolley 7 inside the aircraft passenger cabin, a further electric drive for raising and lowering the trolley 7 and a current collector 20 for supplying current to the installed electric motors 36, 37. The service crew is as a result relieved of physically tiring work and the trolley 7 is secured against uncontrolled movements during the service phase.

19 Claims, 4 Drawing Sheets

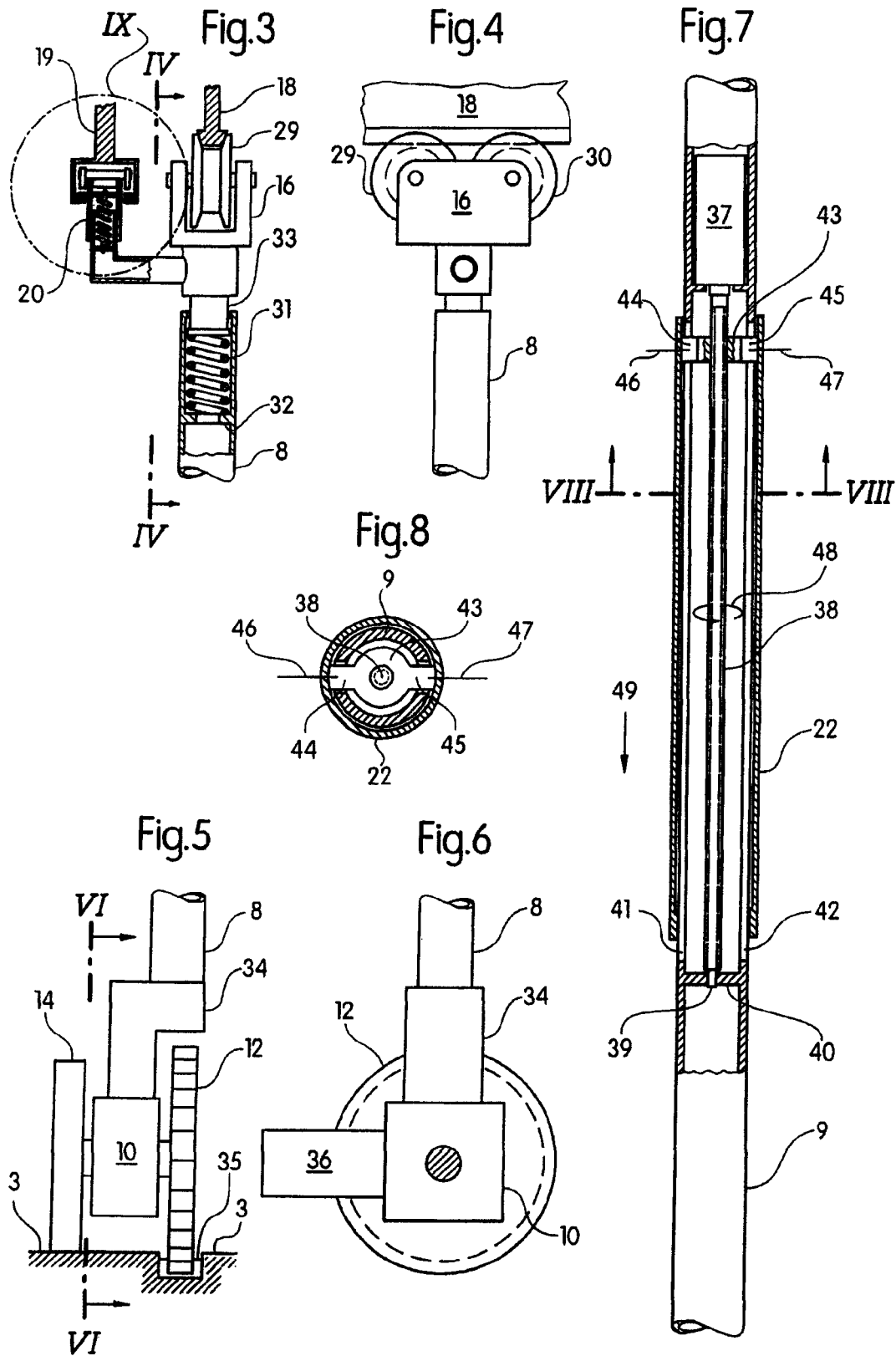

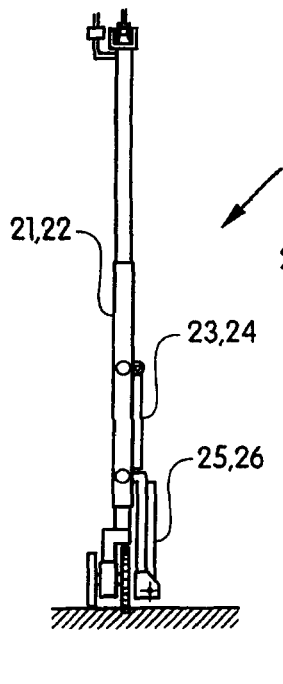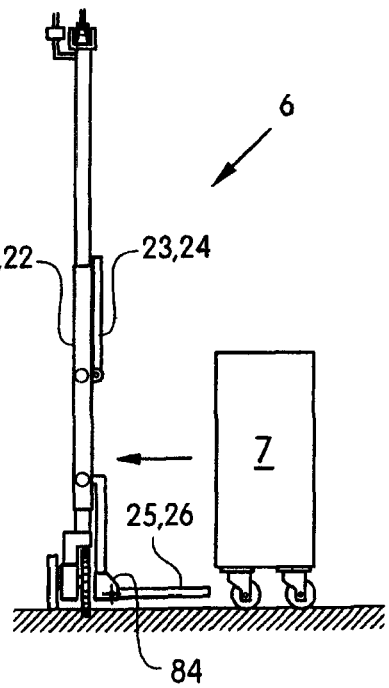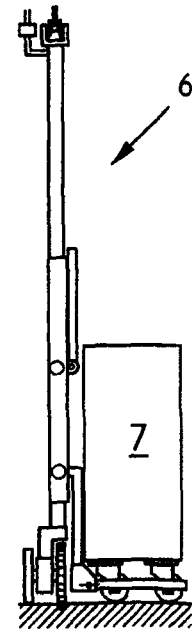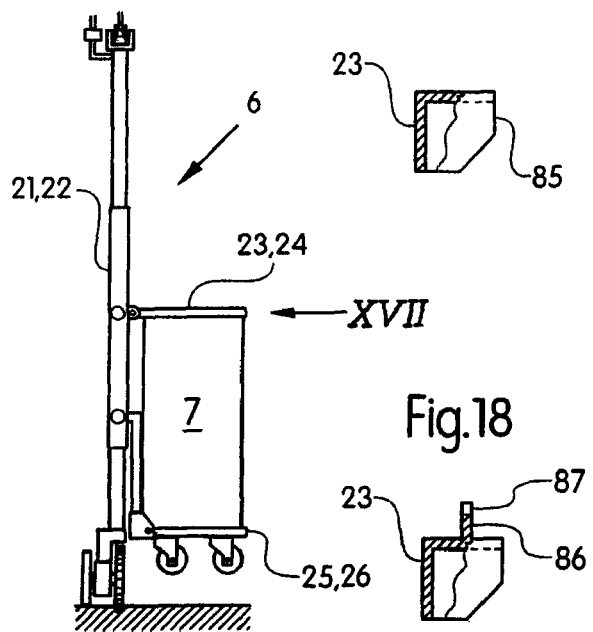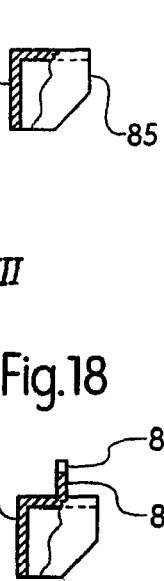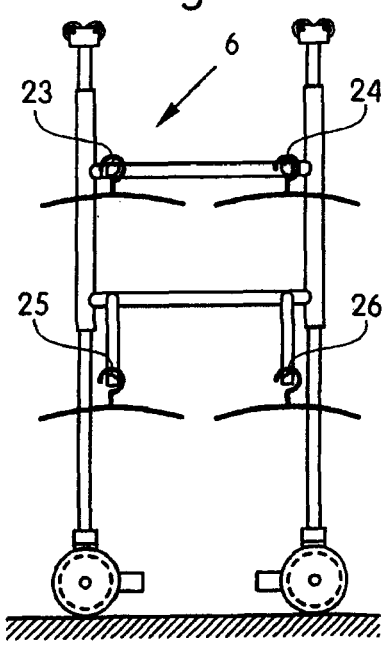

CONVEYING DEVICE FOR A TROLLEY IN AN AIRCRAFT CABIN

CROSS-REFERENCE TO RELATED APPLICATION

Figure 1:
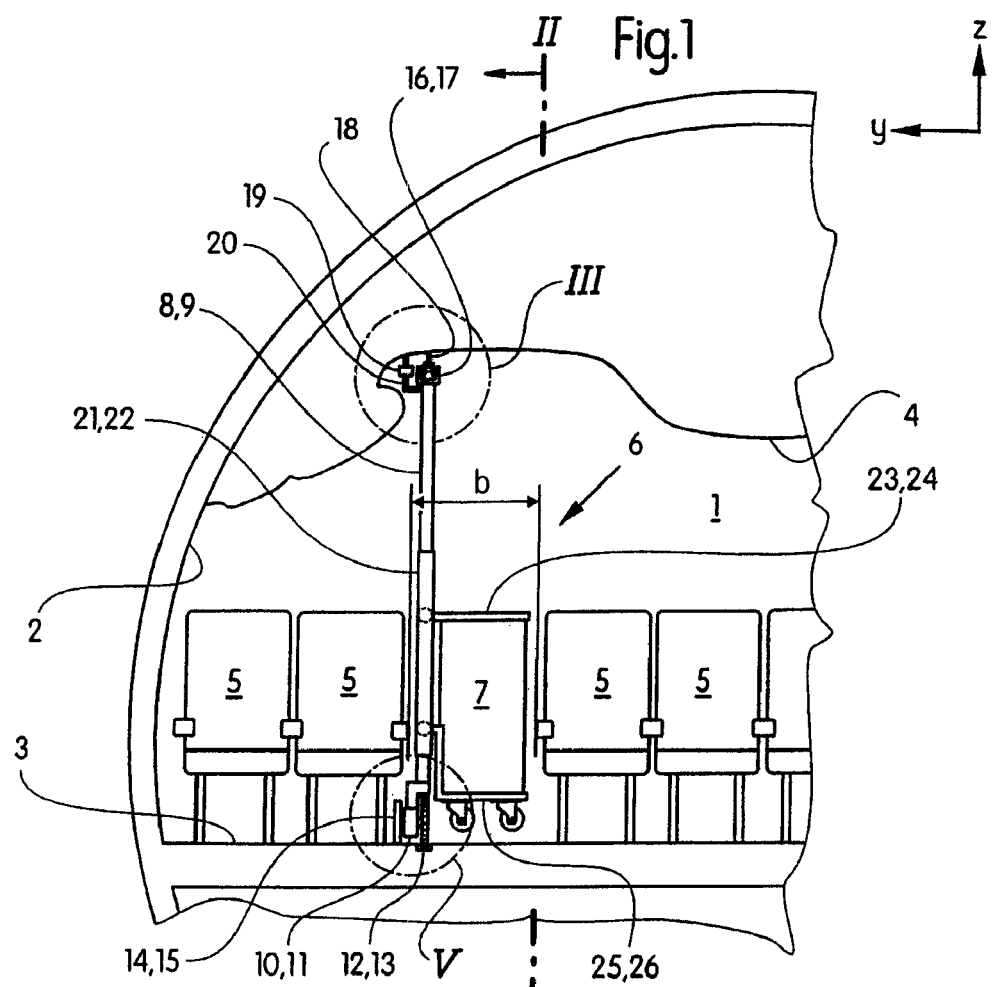

This application claims priority to U.S. Provisional Patent Application No. 61/057,276 filed May 30, 2008 and German Patent Application No. 10 2008 026 087.8, filed May 30, 2008, the disclosures of which are incorporated herein by reference.

The invention relates to a conveying device for a trolley, in particular for a refreshments trolley, in an aircraft passenger cabin. These trolleys are manually movable containers for food and drinks and are used on board passenger aircraft in order to provide the passengers with food and drinks during relatively long flights. For this purpose the trolleys are as a rule loaded with drinks and ready-to-serve meals located on appropriate trays, brought on board and stored here before take-off. Each trolley has its own location, at which it is securely locked against rolling out. In order to distribute the food to the passengers during the flight, the trolleys are removed from their storage spaces by the cabin crew and manually rolled through the aisles located between the rows of seats to the passengers who are to be served. Once the passengers of one row of seats have been served, the trolley is rolled to the next row of seats. For safety reasons the wheels of the trolley have to be blocked upon each stop and released again for each continuing journey. However blocking the wheels does not prevent possible lifting of the trolley. The crew must bend down low in order to reach the bottom tray in a trolley. Twelve trays are located in one trolley. Once these have been distributed, the empty trolley must be moved back and a new one moved up. During the entire distribution phase the trolleys are directly in motion or at a standstill, but never locked. When there is significant turbulence, in particular in the case of down gusts, this can lead to the trolleys executing uncontrolled movements, whereby substantial damage can occur. A further service which is offered by the cabin crew consists in hanging the jackets of the passengers in cupboards for the duration of the flight, where they can be kept without creasing, as opposed to when storing them in the luggage racks.

The previous method of handling the trolleys on board passenger aircraft entails the disadvantage of the cabin crew being subject to significant physical stresses when carrying out the above-mentioned activities. These include the manual movement, in particular of the freshly loaded trolleys, bending down to reach the bottom trolley levels and carrying the jackets to and from the storage cupboards. A further disadvantage of the previous method of handling the trolleys lies in the fact that these are not secured against uncontrolled movements during their use in the cabin.

The invention is therefore based on the object of providing a conveying device for a trolley in an aircraft cabin such that manual handling of the trolley is largely avoided and the trolley is also secured against uncontrolled movements during its use.

This object is achieved according to the invention, in particular for a refreshments trolley, in an aircraft passenger cabin in that the conveying device comprises an electric drive with two drive wheels for moving the trolley inside the aircraft passenger cabin, an electric drive for raising and lowering the trolley and a current collector for supplying current to the installed electric motors.

Further advantageous configurations of the invention are presented in the subclaims.

The invention is represented in the drawings and illustrated in detail on the basis of the description.

Figure 2:
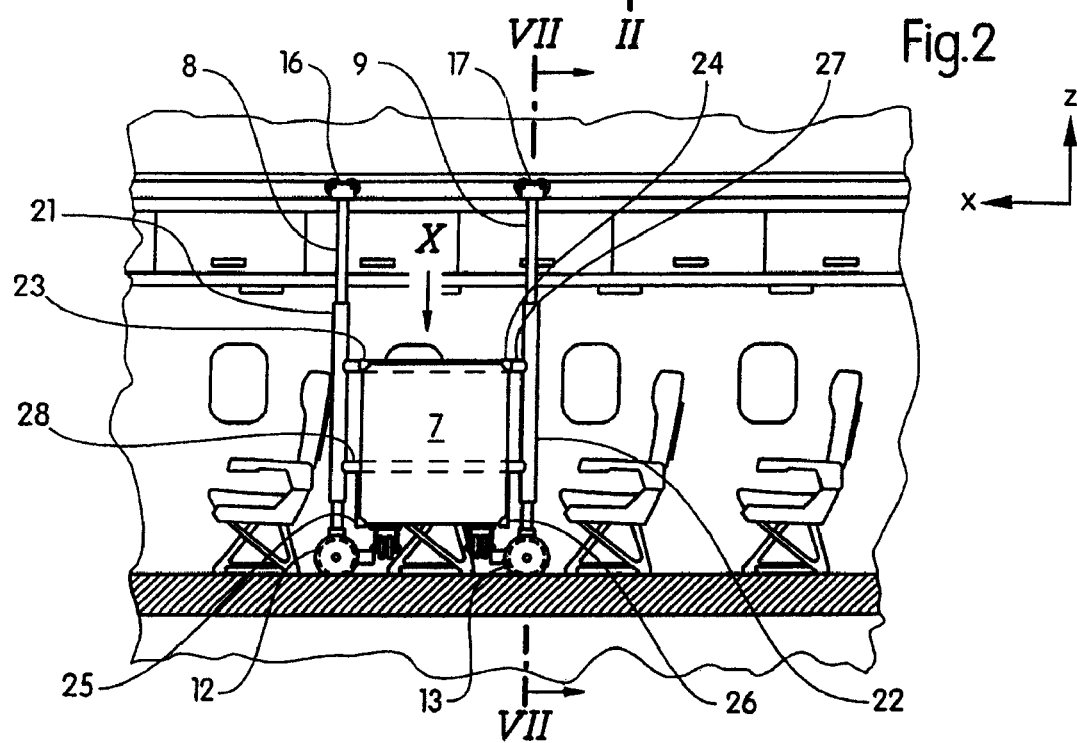
Figure 9:
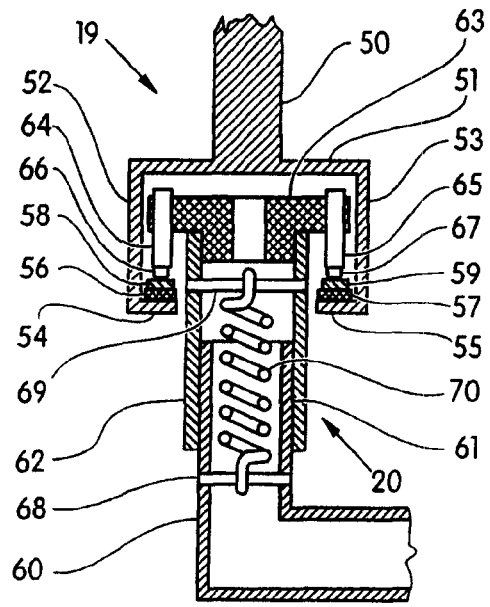
Figure 12:
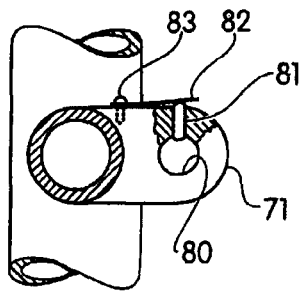
Figure 10:
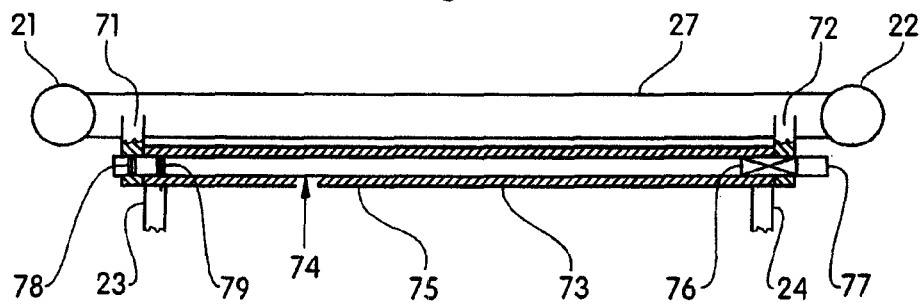
Figure 11:
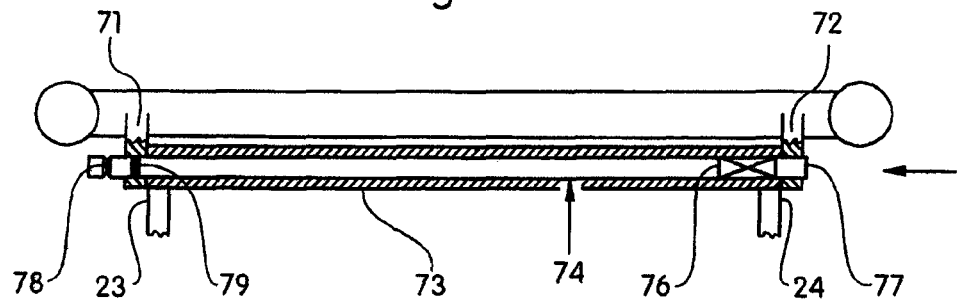

In the drawings:

FIG. 1 shows a partial view of an aircraft cabin against the direction of flight, FIG. 2 shows the section II-II according to FIG. 1, FIG. 3 shows the detail III according to FIG. 1, FIG. 4 shows the section IV according to FIG. 3, FIG. 5 shows the detail V according to FIG. 1, FIG. 6 shows the view VI according to FIG. 5, FIG. 7 shows the section VII according to FIG. 2, FIG. 8 shows the section VIII according to FIG. 7, FIG. 9 shows the detail IX according to FIG. 3, FIG. 10 shows the view X of a cross strut according to FIG. 1, FIG. 11 shows a pivoting tube, FIG. 12 shows a bearing block, FIG. 13 shows the device in a space-saving configuration, FIG. 14 shows the device ready for receiving a trolley, FIG. 15 shows the trolley according to FIG. 14 in the device, FIG. 16 shows the device with the trolley in a ready-to-move state, FIG. 17 shows a projecting arm in cross section, FIG. 18 shows the projecting arm according to FIG. 17 with a longitudinal strip and FIG. 19 shows the device equipped with clothes hangers.

FIG. 1 shows a partial view of an aircraft cabin 1, against the direction of flight, with side lining 2, a floor 3 and an inside roof lining 4. The coordinate system y, z indicates that the y direction extends parallel to the transverse axis and the z direction parallel to the vertical axis of the aircraft. The figure also shows a row of seats 5 with a longitudinal aisle of the width b. A conveying device 6 for a trolley 7 is located within the longitudinal aisle. This conveying device 6 consists essentially of two columns 8, 9 which at their bottom end each comprise a drive unit 10, 11 with a respective drive wheel 12, 13 and a respective support wheel 14, 15. The occurrence in pairs of reference characters indicates that, although the elements in question are present in duplicate, only the element which is named first in each case is visible on account of the viewing direction. A guide unit 16, 17, which interacts with a guide rail 18, is arranged at the top end of each column 8, 9. A current rail 19, with which a current collector 20 interacts, extends directly adjacent to the guide rail 18. Furthermore, each column 8, 9 comprises an elevating tube 21, 22 which coaxially embraces the column and, sliding on the respective column 8, 9, can be moved by a motor in the z direction. Each elevating tube 21, 22 comprises a top projecting arm 23, 24 and a bottom projecting arm 25, 26 which, as shown, embrace the trolley 7. The trolley can thus be raised and set down by means of the elevating tubes 21, 22 via the projecting arms 21, 22, 23, 24. For structural reasons the bottom projecting arms 25, 26 have an elbowed shape.

FIG. 2 shows the conveying device with the columns 8, 9, the elevating tubes 21, 22, the drive wheels 12, 13 and the guide units 16, 17. Both elevating tubes 21, 22 are connected together by two cross struts 27, 28, so that a stiff frame is produced. The figure also shows the top projecting arms 23, 24 as well as the bottom projecting arms 25, 26. As the path of the cross struts 27, 28 is for the most part concealed by the trolley 7, the cross struts 27, 28 are represented by broken lines here. The coordinate system x, z which is shown indicates that the x direction extends parallel to the longitudinal axis and the z direction parallel to the vertical axis of the aircraft. The trolley 7 can be transported in the x direction by means of the drive wheels 12, 13. The figure is represented shortened in the z direction for the sake of clarity.

FIG. 3 shows in the detail III according to FIG. 1 the top end of the column 8 with the guide unit 16, the guide rail 18 and the current rail 19 with the current collector 20. The figure shows a guide roller 29 in engagement with the guide rail 18. Arranged in the top end of the column 8 is a compression spring 31 which rests with its bottom end on a support wall 32 and acts with its top end under a defined bias on a piston 33 which is firmly connected to the guide unit 16. This results in the guide roller 29 always interacting with the guide rail 18 free from play in spite of possible mechanical inaccuracies of the passenger cabin.

FIG. 4 shows the section IV-IV according to FIG. 3 with the column 8, the guide unit 16 and the guide rail 18. The figure shows the arrangement of two guide rollers 29, 30. The travelling behaviour of the conveying device is as a result improved. One configuration of the invention consists in providing just one guide roller 29 for each guide unit 16, 17. This facilitates travelling around tight bends.

FIG. 5 shows the detail V according to FIG. 1 with the bottom end of the column 8, the drive unit 10, the drive wheel 12 and the support wheel 14. For reasons of space the drive unit 10 is staggered to the left in the figure with respect to the column 8, this being achieved by a transition part 34. A tooth rail 35 is let into the floor 3, with which rail the drive wheel 12 meshes with its tooth system. The support wheel 14 has no drive function and serves solely to support the column 8.

FIG. 6 shows the section VI-VI according to FIG. 5 with the bottom end of the column 8, the drive unit 10, the drive wheel 12 and the transition part 34. An electric motor 36 is arranged on the drive unit 10, with a gear unit being provided inside the drive unit 10 to adapt the motor speed to the travelling speed of the drive wheel 12.

FIG. 7 shows the section VII-VII according to FIG. 2 with the column 9 and the elevating tube 22. Arranged in the top area of the column 9 is an electric motor 37 with an elongated elevating spindle 38 which extends axially inside the column and is mounted at its bottom end with a pin 39 in a support wall 40. In the area of the elevating tube 22 the column 9 comprises two diametrically opposite longitudinal slots 41, 42. The elevating spindle 38 interacts with an elevating nut 43 arranged inside the column 9. This nut is provided with two protrusions 44, 45 which are guided in the longitudinal slots 41, 42. The elevating nut 43 is firmly connected to the elevating tube 22 at the locations 46, 47. If the elevating spindle 38 is rotated by the motor 37 in the direction of the arrow 48, the elevating nut 43 and with this the elevating tube 22 is lowered in the direction of the arrow 49. The elevating tube 22 is raised when the elevating spindle 38 rotates in the opposite direction. The solution which is described here also applies accordingly to the column 8 with the elevating tube 21.

FIG. 8 shows the section VIII-VIII according to FIG. 7 with the column 9, the elevating tube 22 and the elevating spindle 38. The figure shows the elevating nut 43 in a view with the protrusions 44, 45. The protrusions 44, 45 can be connected to the elevating tube 22 at the locations 46, 47 by means of screws.

FIG. 9 shows the detail IX according to FIG. 3 with the current rail 19 and the current collector 20. The profile of the current rail 19 consists essentially of a connecting web 50 and of a C-profile which is attached to the latter, is open in the downward direction and in turn consists of a yoke 51, two legs 52, 53 and two edge strips 54, 55. Each edge strip 54, 55 represents a kind of flange and on its inside bears a respective electrical insulating layer 56, 57, on which a respective electrical conductor track 58, 59 is arranged. The current collector 20 is rigidly connected to the guide unit 16 according to FIG. 3 by a carrier part 60. The carrier part 60 passes in the upward direction into a cylindrical stub 61. A tube 62 embraces the stub 61 and can be vertically displaced on this. A head part 63 of an electrically insulating material is firmly connected to the top end of the tube 62. Two metallic contact holders 64, 65, in the bottom ends of which a respective sliding contact 66, 67 is inserted, are arranged inside this head part 63. A diametrically inserted pin 68 is located in the bottom area of the stub 61. A pin 69 of the same kind is located in the top area of the tube 62. A tension spring 70 is clamped between the two pins 68, 69. The current collector 20 moves with the sliding contacts 66, 67 perpendicularly to the plane of the figure during the travelling movement of the conveying device. At the same time the sliding contacts 66, 67 slide over the conductor tracks 58, 59 and are constantly held in contact with these by the tension spring 70. Starting from the contact holders 64, 65, electrical lines are routed through the carrier part 60 to the internal circuit of the conveying device.

FIG. 10 shows the view X of the cross strut 27 according to FIG. 1 with the elevating tubes 21 and 22. Two bearing blocks 71 and 72 are firmly connected to the cross strut 27. A pivoting tube 73, to which the projecting arms 23 and 24 are fastened, extends between these. The pivoting tube 73 with the projecting arms 23, 24 rotates about a shaft 74 which is mounted in the bearing blocks 71, 72. The shaft 74 consists essentially of an area 75 of a circular cross section which is adjoined on the right-hand side in the figure by a four cornered part 76 of a square cross section, in turn followed by an area 77 of a circular cross section. Here the diameter of the shaft is the same as the inscribed circle diameter of the four cornered part 76. At its left-hand end the shaft 74 comprises two circumferential detent notches 78 and 79. The internal shape of the pivoting tube 73 is formed at its end which is on the right in the figure so that the four cornered part 76 is positively held here. A particular feature of the bearing block 72 lies in the fact that, instead of the usual bearing bore, it comprises a square aperture which is adapted to the four cornered part 76. In the representation which is shown the four cornered part 76 is inserted in the bearing block 72. The projecting arms 23, 24 are thus (horizontally) locked in the position which is shown.

FIG. 11 shows the pivoting tube 73 with the projecting arms 23, 24 in the unlocked position. This unlocking is achieved in a simple operating measure by pushing in the area 77 protruding at the bearing block 72 in FIG. 10 in the direction of the arrow. The four cornered part 76 is thereby disengaged from the bearing block 72 and the pivoting tube 73 released to pivot into another position. The detent notches 78, 79 interact with a detent device of the bearing block 71 in order to prevent unintended displacement of the shaft 74 in the axial direction.

FIG. 12 shows the bearing block 71 with the bearing bore 80. Here a detent pin 81 is inserted in a sliding manner in a bore which is radial in relation to the bearing bore 80. The detent pin 81 interacts with a leaf spring 82 which is secured by a screw 83.

FIG. 13 shows the conveying device 6, with the projecting arms 23, 24 and 25, 26 being pivoted so that they extend parallel to the elevating tubes 21, 22. As a result, minimum storage space is required for the conveying device 6 when it is not in use.

FIG. 14 shows the conveying device 6 prepared to receive a trolley 7. Elevating tubes 21, 22 are brought into their lowest position for this purpose. The projecting arms 23, 24 are in addition brought upwards into the position which is shown. The projecting arms 25, 26 are also pivoted upwards into their horizontal position. On this occasion the pivoting angle is limited to 90° by a stop 84. The trolley 7 can thus now be moved in the direction of the arrow into the conveying device 6.

In FIG. 15 the trolley has been moved into the conveying device 6 and can now be raised.

In FIG. 16 the trolley 7 has been raised by raising the elevating tubes 21, 22 with the projecting arms 25, 26 to an extent such that its wheels are suspended above the floor at a suitable distance. In the representation which is shown the projecting arms 23, 24 are brought into their horizontal position and locked, so that the trolley 7 is firmly embraced by the conveying device 6. The trolley 7 can thus be used inside the aircraft cabin for carrying out service functions. It is in this respect guaranteed that, even if down gusts occur, the trolley 7 will be securely held in the conveying device 6 and not execute any uncontrolled movements.

FIG. 17 shows the view XVII of the projecting arm 23 according to FIG. 16. Here an end plate 85 is partly broken up in order to show the angular cross section of the projecting arm 23. Corresponding end plates are also provided at the projecting arms 24, 25, 26. The trolley 7 is fixed in all directions in consequence of the angular shape and the end plates.

FIG. 18 shows another configuration of the projecting arm 23, in which case the profile in question comprises in its top area an upended longitudinal strip 86 into which a plurality of notches 87 are worked to receive clothes hangers. This offers the possibility of also using the conveying device 6 to transport jackets.

FIG. 19 shows a corresponding use of a conveying device 6, in which case all projecting arms 23, 24, 25, 26 are equipped with clothes hangers. The service crew is as a result spared the tiring task of manually transporting the jackets to and from the cupboards in question.

The advantageous effect of using a pivoting tube, as described in connection with the projecting arms 23, 24, is that it is sufficient to take hold of one of the projecting arms 23, 24 in order to position both at the same time. One configuration of the invention therefore lies in connecting the projecting arms 25, 26 together by a pivoting tube.

The conveying device 6 can be used to transport either trolleys or jackets. The rail system on the aircraft side with the tooth rail 35, the guide rail 18 and the current rail 19 is accordingly provided with a routing means, so that the conveying devices can run both between the galley area and the longitudinal aisles and between the storage cupboards for the jackets and the longitudinal aisles.

The invention claimed is:

1. A conveying device for a trolley, in particular for a refreshments trolley, in an aircraft passenger cabin, comprising:
    an electric drive with two drive wheels for moving the trolley inside the aircraft passenger cabin,
    a further electric drive for raising and lowering the trolley, the further electric drive device arranged inside two columns on which a respective elevating tube is vertically movable, and
    a current collector for supplying current,
    wherein the electric drive for moving the trolley comprises two drive units, each arranged at a bottom end of a different one of the two column, and each including an electric motor, a gear unit, one of the two drive wheels and a support wheel, wherein the two drive wheels interact with a tooth rail on the cabin side.

2. The conveying device according to claim 1, wherein the elevating tubes are connected together by two cross struts to produce a frame.

3. The conveying device according to claim 2, wherein the further electric drive comprises an electric motor with an elevating spindle and an elevating nut arranged inside the columns, wherein the elevating nut comprises two protrusions which are guided in longitudinal slots, and the elevating tubes are firmly connected to the protrusions.

4. Conveying device according to claim 2, wherein two top projecting arms are arranged on a top one of the two cross struts and two bottom projecting arms are arranged on a bottom one of the two cross struts.

5. The conveying device according to claim 4, wherein the top projecting arms are pivotable with a pivoting tube about a shaft.

6. The conveying device according to claim 5, wherein the shaft comprises a four cornered part which interacts with a square aperture inside a bearing block such that the pivoting tube with the projecting arms is locked or unlocked by displacing the shaft.

7. The conveying device according to claim 6, wherein the shaft comprises two circumferential detent notches which interact with a detent pin arranged inside a bearing block.

8. The conveying device according to claim 4, wherein the bottom projecting arms have an elbowed shape.

9. The conveying device according to claim 8, wherein a pivoting angle of the bottom projecting arms is limited to 90° by a stop.

10. The conveying device according to claim 1, wherein the current collector comprises a head part of an electrically insulating material in which two metallic contact holders with inserted sliding contacts are arranged.

11. The conveying device according to claim 10, the head part with the contact holders and the inserted sliding contacts is brought by means of a tension spring into contact with electrical conductor tracks which are arranged inside a current rail.

12. The conveying device according to claim 4, wherein the projecting arms have an angular cross section and are provided with an end plate.

13. The conveying device according to claim 4, the projecting arms comprise in the top area of their cross section an upended longitudinal strip with notches.

14. The conveying device according to claim 4, wherein the bottom projecting arms are connected together by a pivoting tube.

15. The conveying device according to claim 1, wherein the conveying device is usable to transport jackets.

16. A conveying device for a trolley, in particular for a refreshment trolley, in an aircraft passenger cabin, the conveying device comprising:
    a frame having one end coupled to a plurality of drive wheels, a pair of elevating tubes movably mounted to the frame and engageable with the trolley,
    a first electric drive carried by the frame and configured to drive the plurality of drive wheels to move a combination of the frame and the trolley along the aircraft passenger cabin with the trolley supported by the pair of elevating tubes and suspended above a floor of the cabin, and
    a second electric drive carried by the frame and configured to raise and lower the pair of elevating tubes to raise and lower the trolley.

17. The conveying device according to claim 16 further comprising:
    a guide rail extending along the aircraft passenger cabin, and
    a guide unit engageable with the guide rail and coupled to an opposite end of the frame, wherein the combination of the frame and the trolley moves in the aircraft passenger cabin along the guide rail.

18. The conveying device according to claim 16 wherein the frame comprises first and second columns,
   and wherein one of the pair of elevating tubes is movably disposed about the first column and the other of the pair of elevating tubes is movable disposed about the second column,
   and wherein the second electric drive is configured to drive the pair of elevating tubes longitudinally along the first and second columns to raise and lower the trolley.

19. The conveying device according to claim 16 wherein the second electric drive comprises one electric drive is arranged inside the first column and another electric drive arranged inside the second column.

* * * * *